United States Patent [19]
Takahashi et al.

[11] Patent Number: 5,560,217
[45] Date of Patent: Oct. 1, 1996

[54] AIR CONDITIONING SYSTEM OF HEAT PUMP TYPE

[75] Inventors: Torahide Takahashi; Nobushige Suzuki; Kiyoshi Koike, all of Tokyo, Japan

[73] Assignee: Calsonic Corporation, Tokyo, Japan

[21] Appl. No.: 388,438

[22] Filed: Feb. 14, 1995

[30]     Foreign Application Priority Data

| Feb. 14, 1994 | [JP] | Japan | 6-17685 |
| May 10, 1994 | [JP] | Japan | 6-96786 |

[51] Int. Cl.⁶ .............................. F25B 5/00; F25B 41/04
[52] U.S. Cl. .............................................. 62/200; 62/217
[58] Field of Search ................................. 62/217, 200, 90

[56]              References Cited

U.S. PATENT DOCUMENTS

| 5,299,431 | 4/1994 | Iritani et al. | 62/243 |
| 5,375,427 | 12/1994 | Hara et al. | 62/159 |
| 5,404,729 | 4/1995 | Matsuoka et al. | 62/90 |

FOREIGN PATENT DOCUMENTS

| 2044161 | 2/1990 | Japan | 62/90 |
| 5-201243 | 8/1993 | Japan . | |

OTHER PUBLICATIONS

Patent Abstracts of Japan, vol. 18, No. 366, p. 01/01, Dec. 4, 1994.
Suzuki et al., *Dehumidifying-type heat pump system for electric vehicles*, Calsonic Corporation, Aug. 31, 1994.
Research Paper on Global Environmental Problems, pp. 1–9, 19 and 69.

*Primary Examiner*—William E. Wayner
*Attorney, Agent, or Firm*—Foley & Lardner

[57]              ABSTRACT

A heat pump type air conditioning system comprises an air duct in which air flows in a given direction with an aid of an electric air blower. A condenser is disposed in the air duct. A compressor has an outlet connected to an inlet of the condenser. A receiver dryer has an inlet connected to an outlet of the condenser. An outside expansion valve has an inlet connected to an outlet of the receiver dryer through a first passage. An outside evaporator has both an inlet connected to an outlet of the outside expansion valve and an outlet connected to an inlet of the compressor through a second passage. An inside evaporator is disposed in the air duct at a position upstream of the condenser. An inside expansion valve has both an inlet connected to the first passage and an outlet connected to an inlet of the inside evaporator. A coolant distributing circuit is further employed which feeds the inside evaporator with at least a part of coolant discharged from the receiver dryer when the coolant pressure in the inside evaporator exceeds a predetermined degree.

17 Claims, 12 Drawing Sheets

COOLER MODE

HEATER MODE

AIR CONDITIONING SYSTEM OF HEAT PUMP TYPE

BACKGROUND OF THE INVENTION

1. Field of the Invention

The present invention relates in general to air conditioning systems of heat pump type for motor vehicles, particularly for electric vehicles, and more particularly, the present invention relates to the heat pump type air conditioning systems having a refrigerating cycle. More specifically, the present invention is concerned with the heat pump type air heating systems which can instantly heat air in the passenger room after start-up thereof and can effectively dehumidify the heated air in the passenger room.

2. Description of the Prior Art

In order to heat air in the passenger room of electric vehicles, heat pump systems are commonly used, which collect outside heat for the heating. One of such heat pump systems is shown in FIG. 18 of the accompanying drawings, which is designated by numeral 100.

As shown in the drawing, the heat pump system 100 has an evaporator 101 which is positioned outside the passenger room to collect outside heat by using a coolant which has been vaporized at a temperature lower than the outside temperature. The coolant thus accumulating heat therein is compressed by a compressor 103 and led to a condenser 105, which is located in a duct 113, to radiate the heat to air in the duct 113. The heated air is led to desired positions of the passenger room with an aid of an electric blower 115 installed in the duct 113. Designated by numerals 107 and 109 are an expansion valve and a receiver dryer (viz., liquid tank) respectively. The receiver dryer 109 has two functions, one being to separate gaseous coolant from liquid coolant, and the other being to dry the coolant.

However, the heat pump system 100 has no function to dehumidify the heated air fed to the passenger room. Thus, in winter, the operation of the system 100 tends to induce undesired misting on a windshield caused by moisture in the passenger room, which prevents the driver from driving safely.

To solve such drawback, another heat pump system 110 has been proposed by Japanese Patent First Provisional Publication 5-201243, which is shown in FIG. 19 of the accompanying drawings.

As shown in the drawing, in the system 110, there are further employed another (or inside) evaporator 117 which is installed in the duct 113 upstream of the condenser 105, a bypass passage 112 which bypasses the outside evaporator 101, a two-way valve 111 which selectively connects the compressor 103 with the outside evaporator 101 or the bypass passage 112, and a check valve 119 which is arranged between the outside evaporator 101 and the bypass passage 112 as shown.

When dehumidification of air in the passenger room is needed, the two-way valve 111 takes the illustrated position. Under this condition, the coolant is forced to flow in the direction of the arrows. With this, the air from the electric blower 115 is cooled and thus dehumidified by the inside evaporator 117 and then heated by the condenser 105 before entering the passenger room.

However, even the heat pump system 110 has failed to obtain a satisfied heating performance because of its inherent construction. This is because the heat source for heating the passenger room is limited to only a heat energy collected by the inside evaporator 117 from the air in the duct 113 and another heat energy produced when the compressor 103 operates. That is, in the system 110, quick heating of the passenger room is not expected particularly at the warm-up time of the vehicle.

SUMMARY OF THE INVENTION

It is therefore an object of the present invention to provide a dehumidifying-type heat pump system which is free of the above-mentioned drawbacks.

That is, in accordance with the present invention, there is provided a dehumidifying-type heat pump system which can instantly heat air in the passenger room after start-up thereof and can effectively dehumidify the air in the passenger room.

According to the present invention, there is provided a heat pump type air conditioning system which comprises an air duct in which air flows in a given direction with an aid of air blowing means; a condenser disposed in the air duct; a compressor having an outlet connected to an inlet of the condenser; a receiver dryer having an inlet connected to an outlet of the condenser; an outside expansion valve having an inlet connected to an outlet of the receiver dryer through a first passage; an outside evaporator having both an inlet connected to an outlet of the outside expansion valve and an outlet connected to an inlet of the compressor through a second passage; an inside evaporator disposed in the air duct at a position upstream of the condenser; an inside expansion valve having both an inlet connected to the first passage and an outlet connected to an inlet of the inside evaporator; and coolant distributing means which feeds the inside evaporator with at least a part of coolant discharged from the receiver dryer when the coolant pressure in an outlet of said inside evaporator exceeds a predetermined degree.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
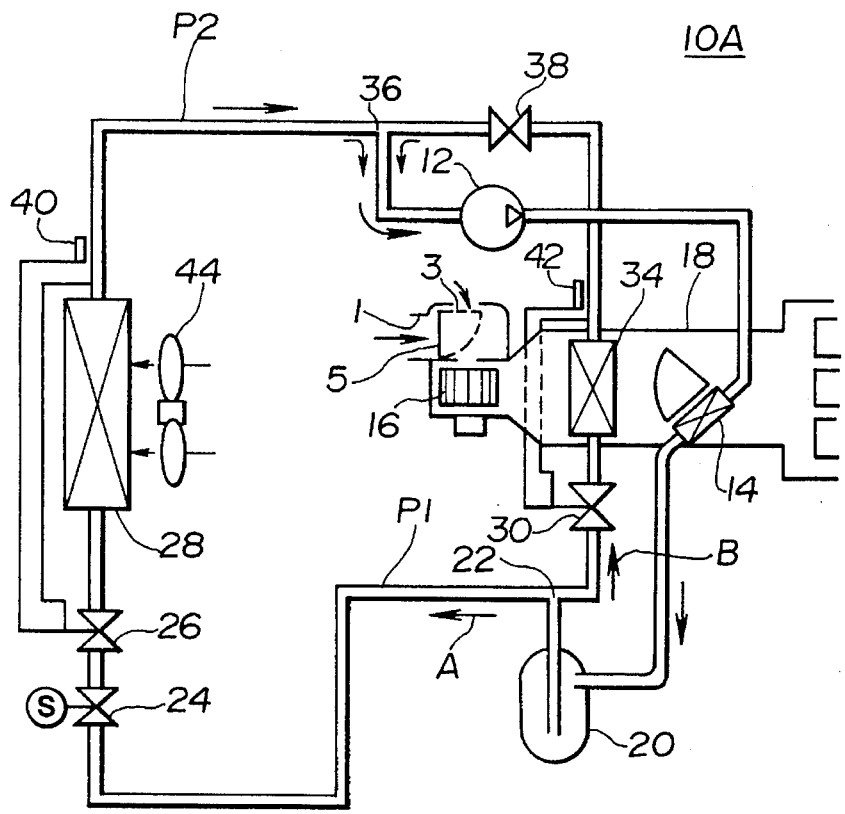
FIG. 1 is a schematically illustrated circuit of a heat pump system which is a first embodiment of the present invention, the system being designed as a heater for a passenger room.

Referring to FIG. 1 of the drawings, there is schematically shown a heat pump system 10A which is a first embodiment of the present invention. As will become apparent as the description proceeds, the system 10A of this first embodiment is designed as a heater for heating a passenger room of an electric vehicle.

The heat pump system 10A comprises a compressor 12 which compresses a coolant. An outlet of the compressor 12 is connected through a passage to a condenser 14 installed in a duct 18 which is led to various positions of the passenger room through various branch tubes thereof. For the reason which will become apparent hereinafter, the condenser 14 is arranged in a relatively downstream part of the duct 18. An electric blower 16 is installed in an upstream part of the duct 18 to produce an air flow directed toward the duct 18.

The upstream part of the duct 18 has first and second openings 1 and 3 whose opening degrees are controlled by a damper door 5. The first opening 1 is connected to the open air, while the second opening 3 is connected to the passenger room. Thus, the outside air is led into the duct 18 through the first opening 1, while the indoor air (viz., passenger room air) is led into the duct 18 through the second opening 3. As will be described hereinafter, when only the second opening 3 is opened, a so-called "reheat mode" is taken by the system 10A, which is the mode to heat the air in the passenger room while circulating the same through the duct 18.

The condenser 14 carries out heat exchange between the gaseous coolant fed thereto from the compressor 12 and the air flow produced by the electric blower 16, so that the air directed to the passenger room is heated. An outlet of the condenser 14 is connected through a passage to a receiver dryer 20.

From the receiver dryer 20, there extends a passage which is connected to an intermediate portion 22 of a passage P1. Thus, a so-called "branch point" is defined at the portion 22. That is, the coolant flow from the receiver dryer 20 is diverted into two flows at the portion 22, as is indicated by the two arrows A and B.

The passage P1 has one end connected through an electromagnetic valve 24 and an outside expansion valve 26 to an outside evaporator (or heat exchanger) 28 which is positioned outside the passenger room. The outside evaporator 28 is arranged to be cooled by an electric fan 44. The passage P1 has the other end connected through an inside expansion valve 30 to an inside evaporator 34 which is installed in the duct 18 upstream of the condenser 14.

An inlet of the compressor 12 is connected through a passage to an intermediate portion 36 of a passage P2. For reason which will become clear hereinafter, a so-called "confluent point" is defined at the portion 36.

The passage P2 has one end connected to an outlet of the outside evaporator 28 and the other end connected through a pressure regulating valve 38 to an outlet of the inside evaporator 34. That is, the coolant from the outside evaporator 28 and that from the inside evaporator 34 meet at the confluent point 36. The pressure regulating valve 38 opens its associated passage when the coolant pressure in the passage is increased beyond a predetermined degree (viz., set pressure "SP").

In the illustrated first embodiment of FIG. 1, "HFC134a" (that is, 1,2,2,2-Tetrafluoroethane) is used as the coolant, and the set pressure "SP" of the pressure regulating valve 38 is 1.9 $Kg/cm^2G$ which is the optimum value when the outside air temperature is 0° C. Of course, in place of "HFC134a", other NON-CFC refrigerant may be also used.

As is known, the optimum set pressure of the valve 38 depends on the outside air temperature. Means for suitably controlling the set pressure "SP" of the valve 38 in accordance with the outside air temperature will be described hereinafter.

A first temperature sensor 40 is arranged near the outlet of the outside evaporator 28. The sensor 40 senses the temperature of coolant in the outlet of the outside evaporator 28 to keep the degree of superheat of the coolant constant with an aid of the outside expansion valve 26. That is, when, for example, the outside air temperature becomes low, the throttle of the outside expansion valve 26 is increased to reduce the pressure of the coolant which is led into the outside evaporator 28 from the outside expansion valve 26. With this, the degree of superheat of the coolant kept constant. Similar to this, the throttle of the inside expansion valve 30 is controlled by a second temperature sensor 42 which senses the temperature of coolant in the outlet of the inside evaporator 34. The expansion valves 26 and 30 may be of a capillary tube type. Of course, these expansion valves 26 and 30 may be controlled by a known electronic controller.

In the following, operation of the heat pump system 10A as a heater will be described.

For ease of understanding, the description will be commenced with respect to a rest condition of the system 10A. Under this rest condition, the outside and inside expansion valves 26 and 30 are both closed, or they are sufficiently throttled not to feed the outside evaporator 28 with the coolant in a liquid state.

When, in response to starting of the associated electric vehicle, the heat pump system 10A starts to operate, the compressor 12 runs to suck therein the coolant from the outside evaporator 28 through the passage P2. Thus, the pressure in the outside evaporator 28 is lowered, and at the same time, the compressor 12 discharges from its outlet a compressed coolant toward the condenser 14. Thus, the pressure in the passage P1, that is, the pressure in the inlet side of each expansion valve 26 or 30, is increased.

Under this start-up condition of the system 10A, the pressure regulating valve 38 is kept closed thereby to close its associated passage. Thus, under this condition, the coolant reaching the branch point 22 is all directed toward the outside expansion valve 26. The coolant is subjected to adiabatic expansion at the outside expansion valve 26 and led into the outside evaporator 28. After collecting heat from the outside air at the outside evaporator 28, the coolant is returned to the compressor 12 and compressed by the same. The compressed coolant is led into the condenser 14 again. Like this, for a while, the coolant circulates in the circuit in the above-mentioned manner. During this circulation, the coolant radiates the accumulated heat therefrom and heat the air in the duct 18.

As is understood from the above, in case wherein, like in the start-up condition of the system 10A, the pressure of coolant fed from the receiver dryer 20 is smaller than the set pressure "SP" of the pressure regulating valve 38, the system 10A acts as a pure heater. Thus, if the system 10A takes the "reheat mode" by fully opening the second opening 3 of the duct 18, quick heating of the passenger room is achieved.

Of course, heating of the passenger room is also achieved by opening the first opening 1 of the duct 18. However, in this case, quick heating may not be expected.

It is now to be noted that in this first embodiment 10A, one advantageous feature is that the period for which the pressure of coolant fed from the receiver dryer 20 is kept smaller than the set pressure "SP" of the pressure regulating valve 38 agrees with the period for which a quick heating of the passenger room is really needed like in the start-up time of the vehicle. That is, during such period, the coolant from the receiver dryer 20 is directed to only the outside evaporator 28 to cause the system 10A to act as a pure heater.

When thereafter the pressure of coolant fed from the receiver dryer 20 is increased to a level of the set pressure "SP", the pressure regulating valve 38 starts to open and thus a part of the coolant from the receiver dryer 20 is directed toward the inside evaporator 34.

As is known, the indoor air (viz., passenger room air) with which the coolant in the inside evaporator 34 will make a heat exchange is warmer than the outside air, and just after opening of the pressure regulating valve 38, the amount of coolant directed to the inside evaporator 34 is small. Thus, just after opening of the valve 38, the coolant in the outlet portion of the inside evaporator 34 has a high temperature. Accordingly, the second temperature sensor 42 controls the inside expansion valve 30 in a manner to increase the amount of coolant led into the inside evaporator 34. That is, the inside evaporator 34 starts to operate as a cooler.

Due to continuous operation of the system 10A, the pressure of coolant directed to the outside expansion valve 26 is gradually increased, so that the amount of coolant led into the outside evaporator 28 is gradually increased even when the outside expansion valve 26 keeps a constant throttle degree. However, since the temperature of the outside air with which the coolant in the outside evaporator 28 makes heat exchange is considered constant, the increase in quantity of coolant directed to the outside evaporator 28 causes lowering of temperature of the coolant discharged from the outside evaporator 28. Thus, the first temperature sensor 40 controls the outside expansion valve 26 in a manner to reduce the amount of coolant led into the outside evaporator 28.

As is described hereinabove, in this heat pump system 10A of the first embodiment, when, upon the coolant pressure exceeding the set pressure "SP", the pressure adjusting valve 38 is opened, the coolant flow fed to the branch point 22 from the receiver dryer 20 is automatically divided into two flows, one being directed toward the outside evaporator 28 and the other being directed toward the inside evaporator 34. That is, one part of the coolant is used as a medium for collecting heat from the outside air, and the other part is used as a medium for collecting heat from the air in the duct 18. When the air in the duct 18 is thus cooled to a level lower than its dew point, moisture in the air becomes dewed, and thus, the air flowing in the duct 18 is dehumidified. It is to be noted that the air thus dehumidified is then heated by the condenser 14 before entering the passenger room.

As is described hereinabove, when the coolant pressure in the inside evaporator 34 is increased to the level of the set pressure "SP" and thus the pressure regulating valve 38 is opened, a part of the coolant from the receiver dryer 20 is automatically directed to the inside evaporator 34 thereby to cool and thus dehumidify the air in the duct 18. Thus, even when the system 10A takes the "reheat mode", the moisture in the indoor air is gradually reduced and thus the undesired misting on a windshield is eliminated.

In this first embodiment, there is another advantageous feature. That is, when a certain time passes after start-up of the system 10A, dehumidifying operation starts automatically.

It is to be noted that if, in case of "HFC134a" as the coolant, the set pressure "SP" of the pressure regulating valve 38 is so determined as to prevent the coolant directed to the inside evaporator 34 from being cooled below its freezing point, undesired freezing of the inside evaporator 34 can be completely eliminated.

When a certain time passes after the pressure regulating valve 38 is opened, the passenger room is heated to a desired level. At this time, the outside expansion valve 26 is almost fully closed, so that almost all of the coolant is directed toward the inside evaporator 34. If the electromagnetic valve 24 is closed, all of the coolant is directed to the inside evaporator 34. Thus, under this condition, the system 10A operates in substantially the see manner as the afore-mentioned conventional system 110 of FIG. 19, and thus, dehumidification and heating of the air are carried out by the system 10A at the same time.

In the heat pump system 10A of the first embodiment, due to provision of the pressure regulating valve 38, the throttling operation of the outside expansion valve 26 and that of the inside expansion valve 30 are substantially automatically controlled in the above-mentioned manner. Such automatic control is carried out without aid of an expensive and complicated electronic controller.

If "HFC134a" is used as the coolant and the set pressure "SP" of the pressure regulating valve 38 is so determined as to prevent the coolant from being cooled below its freezing point, the heat pump system 10A can be continuously operated without worrying about freezing of the inside evaporator 34.

In the system 10A, with passage of time, the heating performance is automatically controlled or lowered, but the humidifying ability is increased. This unique operation is very suited for conditioning air in a passenger room of a motor vehicle in winter. That is, for such conditioning in winter, the humidification is constantly needed for avoiding windshield misting, but the heat quantity for heating the passenger room is gradually reduced as the temperature of the passenger room approaches the set or desired temperature.

When a certain time passes after start-up of the system 10A, almost all of the coolant is directed toward the inside evaporator 34. This means that the heating performance of the system 10A in the start-up condition is the maximum. The reason is as follows.

That is, in order to make a quick heating of the passenger room by collecting a large amount of heat from the outside air which is relatively low in temperature, it is necessary to feed the outside evaporator 28 with a coolant whose temperature is lower than the freezing point. However, if the operation is continued under such condition, any moisture condensed on an outer surface of the outside evaporator 28 becomes frozen and thus the outside evaporator 28 fails to operate normally. However, as is described hereinabove, in the first embodiment 10A, when a certain time passes after start-up of the system, feeding of the coolant to the outside evaporator 28 is automatically stopped and thereafter almost all of the coolant is directed toward the inside evaporator 34. That is, in the invention, only for a limited period (viz., warm-up period) from the system start-up, the system 10A exhibits the highest heating performance, which induces quick heating of the passenger room.

In the following, operation will be described with respect to a condition wherein, with the passenger room kept sufficiently heated under the "reheat mode" of the system 10A, a door of the vehicle is opened.

When the door is opened, the indoor temperature is rapidly lowered due to flowing of the colder outside air into the passenger room. Thus, the air led into the duct 18 through the second opening 3 is lowered, and thus the temperature of coolant in the outlet of the inside evaporator 34 is lowered. When sensing this temperature drop, the second temperature sensor 42 adjusts the throttling of the inside expansion valve 30 for keeping the degree of superheat of the coolant constant, so that the pressure of coolant discharged from the inside evaporator 34 is reduced.

When the reduced pressure of the coolant from the inside evaporator 34 becomes lower than the set pressure "SP" of the pressure regulating valve 38, the throttling of the pressure regulating valve 38 is reduced by a degree corresponding to the reduction of pressure. Accordingly, a part of the coolant at the branch point 22 is now directed toward the outside evaporator 28 as a working fluid for the heater circuit.

As is understood from the above, when the indoor temperature is lowered due to opening the door or the like, the flowing direction of coolant changes so that the heat pump function starts for heating the passenger room. Thus, after the door is closed, the passenger room is heated and the temperature of the indoor air led into the duct 18 through the second opening 3 is increased. Thus, the pressure of coolant in the outlet of the inside evaporator 34 is increased to a level to open the pressure regulating valve 38. Thus, finally, almost all of the coolant at the branch point 22 becomes directed toward the inside evaporator 34.

As is described hereinabove, when the passenger room is cooled after the same has been heated to a sufficient level, a part of the coolant at the branch point 22 is directed toward the outside evaporator 28 for restarting the heater function of the heat pump system 10A. Thus, even when the passenger room is cooled, the same can be quickly heated again to the sufficient level.

In order to examine the performance of the heat pump system 10A of the first embodiment, several experiments were carried out by the inventors.

In the following, results of the experiments will be described with reference to FIGS. 2, 3 and 4. The experiments were those in which a passenger room was heated by using the heat pump system 10A of the first embodiment or some conventional heat pump systems.

Figure 2:
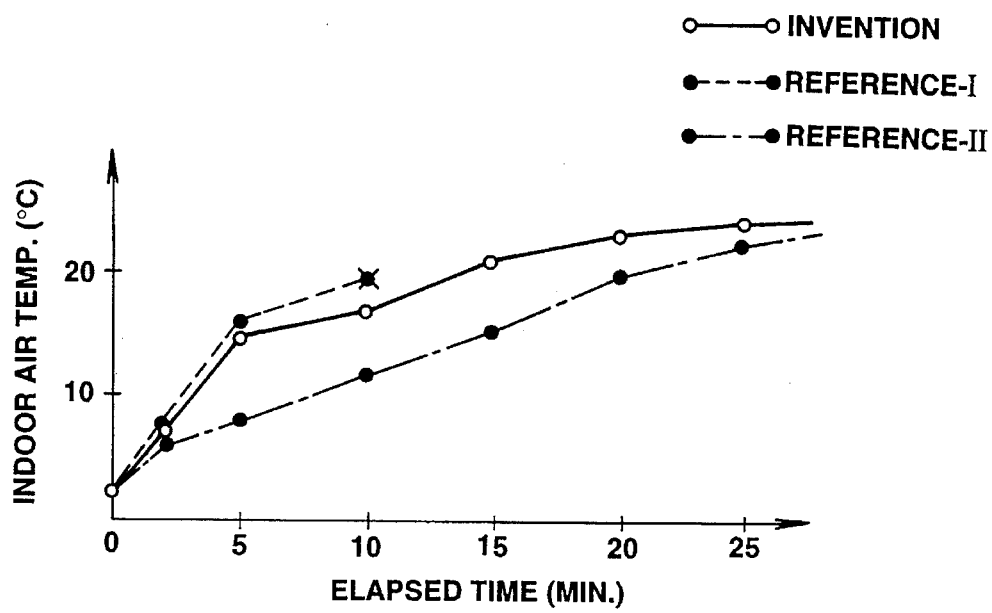
FIG. 2 is a graph showing the heating performance of the first embodiment of FIG. 1, that of the conventional heat pump system of FIG. 18 and that of the other conventional heat pump system of FIG. 19.
Figure 18:
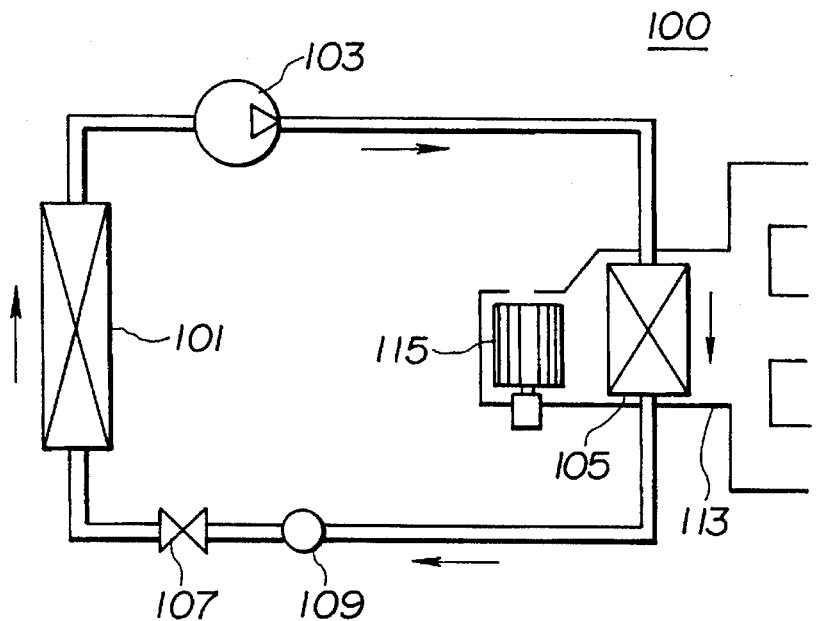
FIG. 18 is a schematically illustrated conventional heat pump system designed as a heater.

FIG. 2 is a graph showing the temperature change in the passenger room with passage of time from start-up of the systems. It is to be noted that the curve indicated by "reference-I" is the result obtained by the conventional heat pump system of FIG. 18 and the curve indicated by "reference-2" is the result obtained by the other conventional heat pump system of FIG. 19.

Of course, the experiments of these three systems were carried out under the same condition. That is, the outside air temperature and the indoor temperature were both zero before starting systems. The relative humidity of them was both 40%, and assumption was so made that the vehicle is running at the speed of 40 Km/h.

As is seen from the graph, in case of reference-I, within about 10 minutes from the system start-up, misting appeared on the windshield. In case of reference-II, the undesired misting did not appear even after 25 minutes from the system start-up and it took about 15 minutes until the indoor temperature was increased to 15° C.

While, in case of the system 10A of the invention, the undesired misting did not appear even after 25 minutes from the system start-up like in case of reference-II. While, in the invention, it took only 5 minutes until the indoor temperature was increased to 15° C.

Thus, it will be appreciated that in accordance with the system 10A of the invention, the undesired misting on a windshield is avoided and a very quick heating of the passenger room from the system smart-up is obtained.

Figure 3:
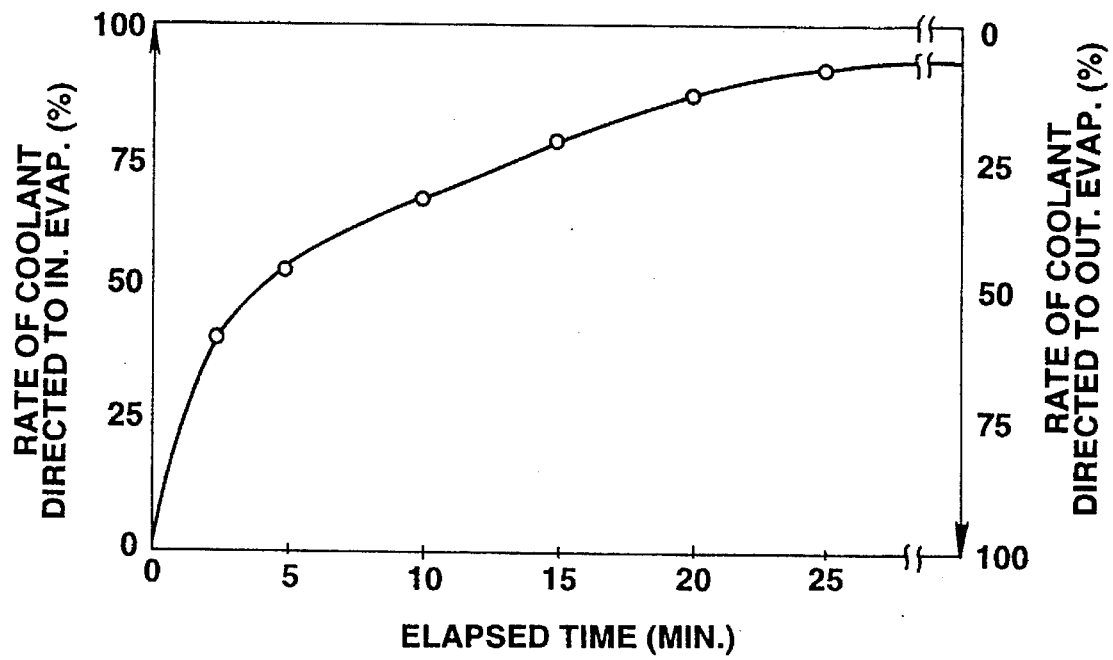
FIG. 3 is a graph showing the coolant distribution characteristic of the first embodiment in terms of the rate between the amount of coolant directed toward an inside evaporator and the amount of coolant directed toward an outside evaporator.

FIG. 3 is a graph showing the coolant distribution characteristic of the system 10A at the branch point 22 in terms of the rate between the amount of coolant directed toward the inside evaporator 34 and that toward the outside evaporator 28.

As is seen from this graph, at the start-up of the system 10A, almost all of the coolant was directed toward the outside evaporator 28. Thus, at that time, the system 10A operates as a pure heater for quickly heating the passenger room. After 5 minutes from the start-up of the system 10A, the distribution rate became to show about 50%, so that about 50% of the coolant was directed toward the inside evaporator 34 for the dehumidification of the air in the passenger room. After 25 minutes from the start-up, almost all of the coolant was directed toward the inside evaporator 34, and thus, heating and dehumidification of the passenger room were carried out simultaneously.

As is mentioned in the foregoing description, in the system 10A of the first embodiment of the present invention, the coolant distribution rate between the inside and outside evaporators 34 and 28 is automatically varied in accordance with the passage of time and/or the change in temperature of the outside air and the indoor air. Thus, avoidance of misting on the windshield and quick heating of the passenger room at the system start-up are both achieved without aid of an expensive and complicated electronic controller.

Figure 4:
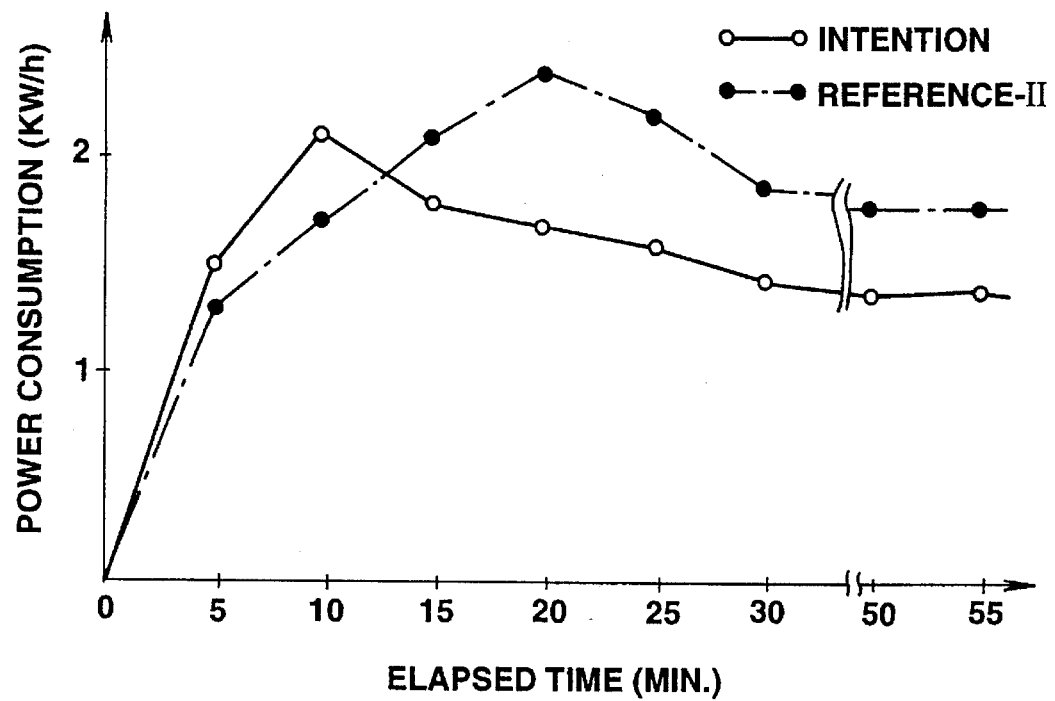
FIG. 4 is a graph showing the power consumption characteristic of the first embodiment and that of the conventional heat pump system of FIG. 19.
Figure 19:
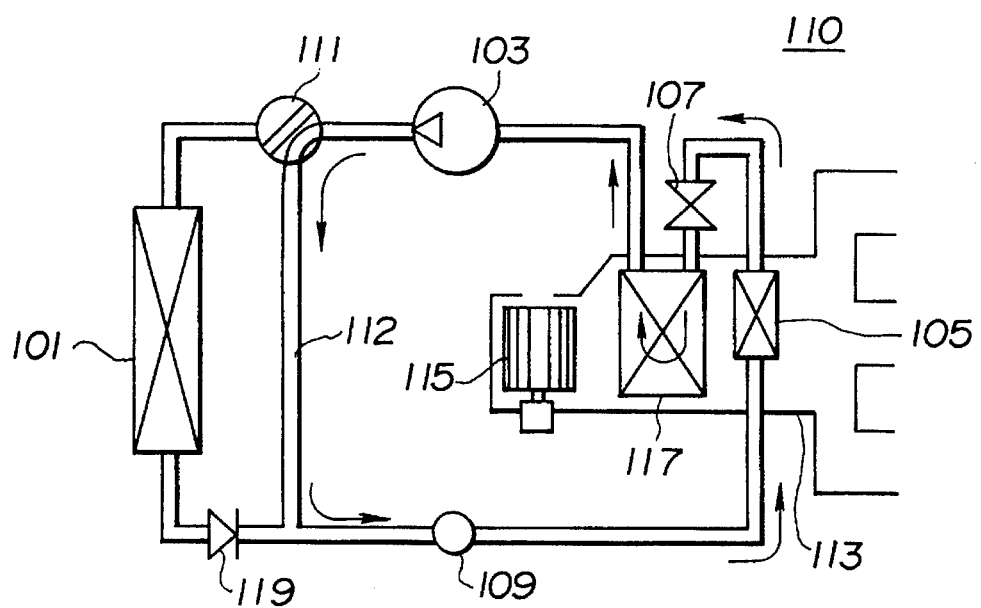
FIG. 19 is a view similar to FIG. 18, but showing another conventional heat pump system designed as a heater.

FIG. 4 is a graph showing the power consumption characteristic of the system 10A and that of reference-II (FIG. 19). The experiment of reference-I was given up halfway because of quick appearance of misting on the windshield. After 25 minutes from the start-up, that is, at the time for keeping the temperature of the passenger room at about 22° C. and dehumidifying the air in the room (see FIG. 2), the prior art system of reference-II consumed about 2.2 KW/h, while the system 10A of the invention consumed only about 1.6 KW/h. Even after 50 minutes from the start-up, the system 10A of the invention showed a smaller power consumption than the system of reference-II.

Thus, it will be appreciated that in the system 10A of the invention, the heating and dehumidification of the indoor air are achieved with a reduced power consumption.

If desired, the valve 35 may have a construction through which the set pressure "SP" thereof can be finely adjusted in accordance with the outside air temperature. In this case, even when the outside air temperature is lower than $-10°$ C., the heat of the outside air can be effectively collected by operating the compressor 12 at high speed.

Figure 5:
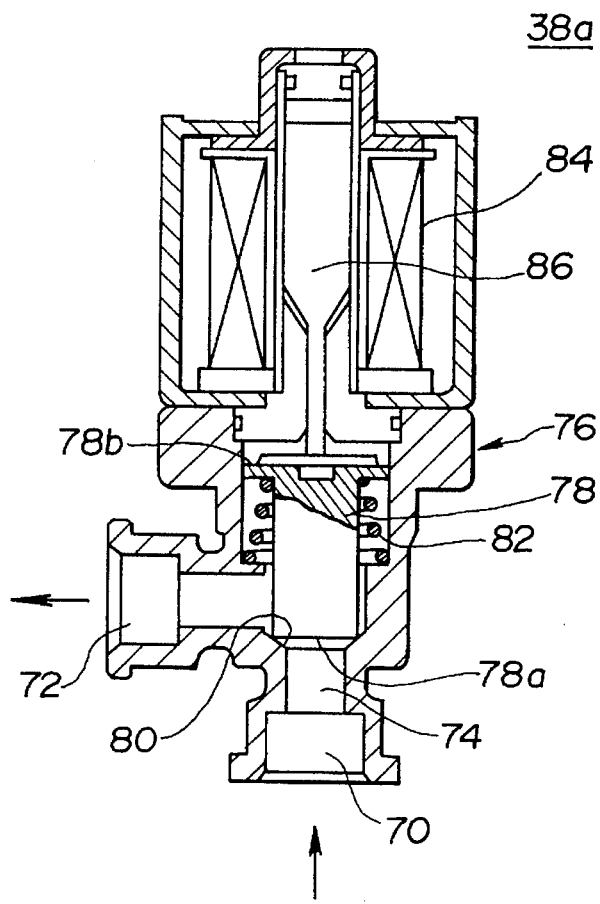
FIG. 5 is a sectional view of an improved pressure regulating valve which is employable in the heat pump system of the first embodiment.
Figure 6:
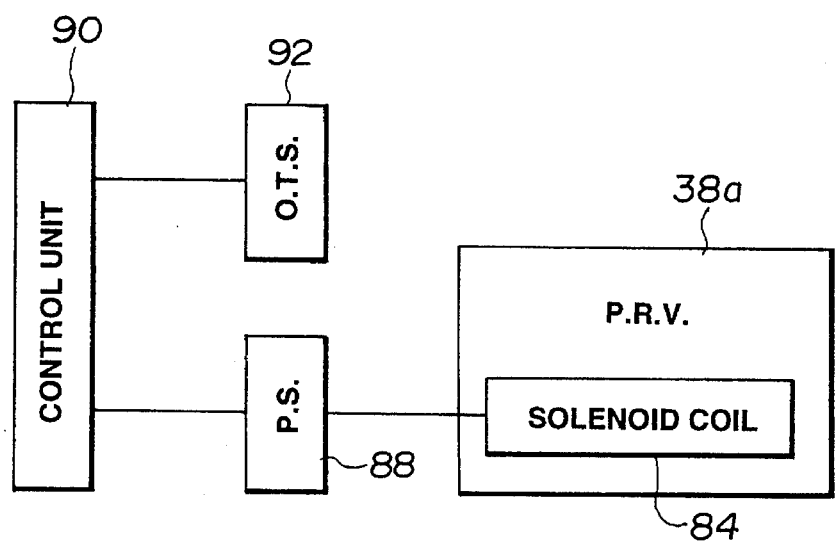
FIG. 6 is a block diagram of a control circuit which controls the improved pressure regulating valve of FIG. 5.
Figure 7:
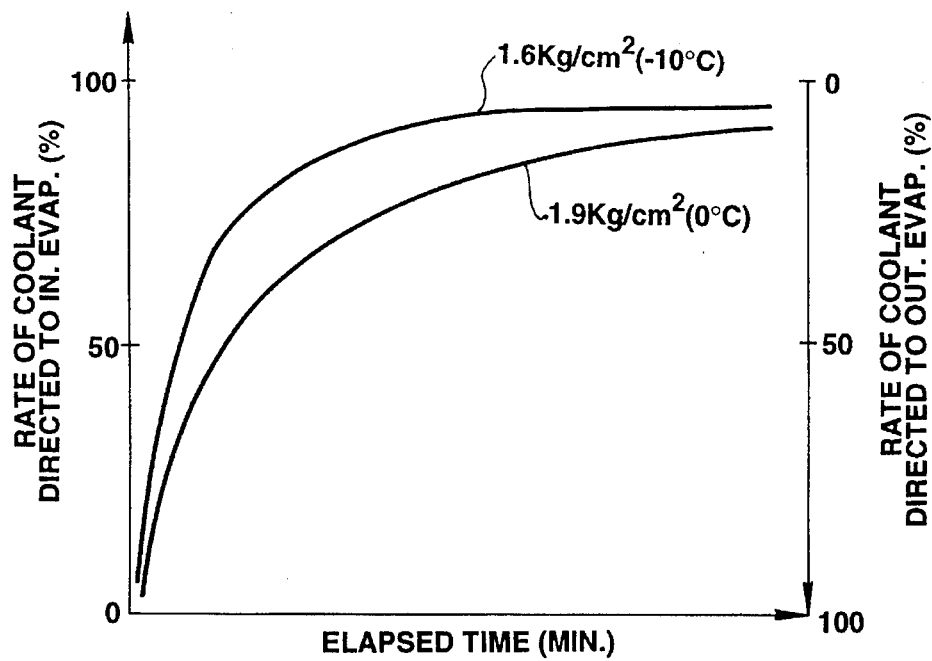
FIG. 7 is a graph similar to that of FIG. 3, but showing two coolant distribution characteristics, each being provided by adjusting the set pressure of the improved pressure regulating valve of FIG. 5 to a given degree.

FIG. 5 shows a pressure regulating valve 38a of such fine adjustable type. FIG. 6 is a block diagram of a control circuit which finely adjusts the set pressure "SP" of the valve 38a in accordance with the outside air temperature, and FIG. 7 is a graph showing the coolant distribution characteristic of the heat pump system 10A which employs the pressure regulating valve 38a of FIG. 5 in place of the valve 38.

As is shown in FIG. 5, the pressure regulating valve 38a comprises a base body 76 having therein a bent passage 74. The bent passage 74 has an inlet portion 70 connected to the inside evaporator 34 (see FIG. 1) and an outlet portion 72 connected to the compressor 12. A cylindrical valve member 78 is axially movably received in a part of the passage 74. A lower tapered end 78a of the valve member 78 is sealingly contactable with a valve seat 80 defined by the part of the passage 74. That is, when the lower tapered end 78a of the valve member 78 is in contact with the valve seat 80 as shown in the drawing, coolant from the inlet portion 70 to the outlet portion 72 is blocked.

The valve member 78 has at its upper end a flange 78b. A coil spring 82 is disposed about the valve member 78 and compressed between the flange 78b and a part of the valve body 76, so that the valve member 78 is biased in a direction away from the valve seat 80.

The flange 78b of the valve member 78 is in abutment with a lower end of a plunger 86 which is axially moved by a solenoid coil 84. The solenoid coil 84 is mounted on the valve body 76. When the solenoid coil 84 is energized by a certain intensity of electric power, the plunger 86 is moved downward moving the valve member 78 to the close position against the force of the coil spring 82. The force of the plunger 86 to keep the valve member 78 at the close position is substantially proportional to the intensity of electric current applied to the solenoid coil 84. Thus, the valve open pressure (viz., set pressure "SP") can be finely adjusted by controlling the intensity of the current.

As is shown in FIG. 6, the solenoid coil 84 is connected to a power supplier 88 which is controlled by a control unit 90. The control unit 90 receives an information signal from an outside air temperature sensor 92. The set pressure "SP" of the pressure regulating valve 38a is thus controlled in accordance with the outside air temperature. That is, when, for example, receiving from the temperature sensor 92 an information signal representing that the outside air temperature is low, the control unit 90 controls the power supplier 88 in a manner to reduce the current applied to the solenoid coil 84. With this, the set pressure "SP" of the valve 38a is set to a low level.

If the outside air temperature is around $-10°$ C., the set pressure "SP" of the valve 38a should be about 1.6 Kg/cm$^2$G. In fact, the set pressure "SP" is previously determined every one degree from for example $-10°$ C. to $+15°$ C. of the outside air temperature.

FIG. 7 is a graph showing the coolant distribution characteristic of two systems, one being provided by adjusting the set pressure "SP" of the pressure regulating valve 38a to 1.9 Kg/cm$^2$G (for the outside air of $0°$ C.) and other being provided by adjusting the set pressure "SP" to 1.6 Kg/cm$^2$G (for the outside air of $-10°$ C.).

As may be seen from the graph of FIG. 7, as the outside air temperature lowered, the time at which the valve 38a starts to open came faster, that is, the time at which the inside evaporator 34 starts to receive the coolant came faster. As a result, the entire amount of coolant fed to the compressor 12 was increased.

When, in general, the outside air temperature is low, coolant flow is restricted and thus the evaporation pressure at the lower pressure size is remarkably lowered. In this case, the compressor 12 tends to have poor lubrication due to undesired foaming of the coolant mixed with the lubrication oil and thus sliding members of the compressor 12 tend to bear a marked load. However, if the above-mentioned pressure regulating valve 38a is used, a larger amount of coolant can be fed to the compressor 12 at early time from the system start-up, so that the above-mentioned lack of lubrication oil at that start-up condition can be avoided. Thus, a high speed operation of the compressor 12 is available even at that start-up condition. Furthermore, since the pressure in the lower pressure side is increased, the load of the compressor 12 can be reduced. Furthermore, since the heating performance of the system 10A is increased due to increase in amount of the coolant fed to the inside evaporator 34, the passenger room can be quickly heated.

If desired, the pressure regulating valve 38a may be modified. That is, the coil spring 82 is disposed between the flange 78b of the valve member 78 and the lower end of the plunger 86. Also in this case, the force for keeping the valve member 78 at the close position can be controlled by the intensity of the current applied to the solenoid coil 84.

Although, in the foregoing description, the outside air temperature is used as a parameter for controlling the current applied to the solenoid coil 84, any physical quantity can be used as the parameter so long as it can vary in accordance with change of the outside air temperature. Furthermore, if desired, as a parameter for controlling the current applied to the solenoid coil 84, the pressure prevailing in the lower pressure portion of the outside evaporator 28 may be used.

In addition to the above-mentioned arrangement in which the set pressure "SP" of the pressure regulating valve 38a is controlled, another measure may be employed wherein when the amount of coolant directed to the outside evaporator 28 is reduced, the electric fan 44 is stopped for power saving. This measure is very effective when the system 10A is mounted on an electric vehicle.

Figure 8:
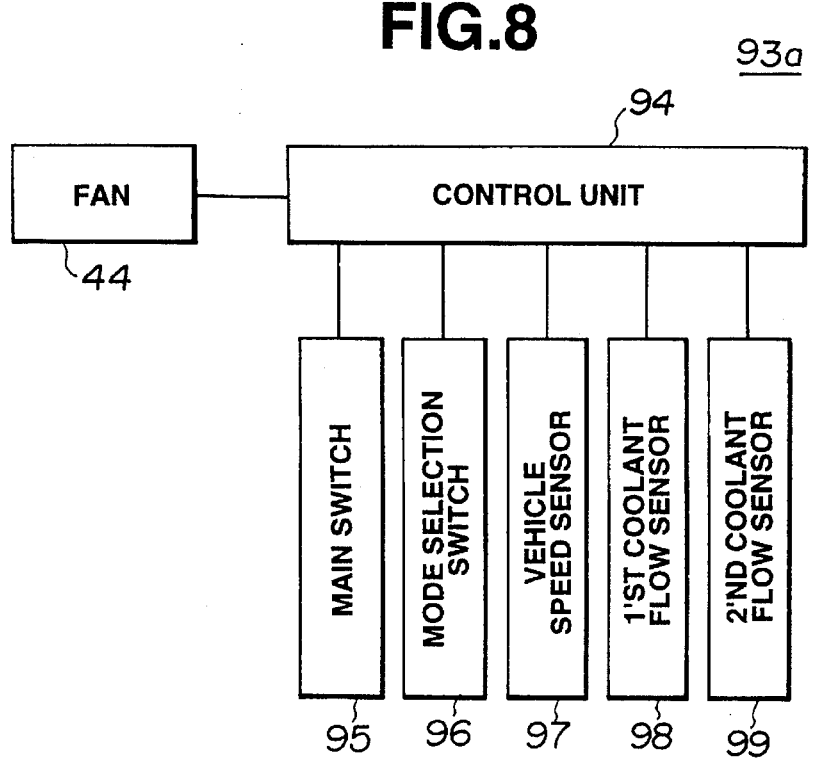
FIG. 8 is a block diagram of a blower control circuit which controls an electric blower employed in the first embodiment.

FIG. 8 is a block diagram of a control circuit 93a which controls operation of the electric fan 44. The circuit 93a comprises a control unit 94 which controls the fan 44 in ON/OFF manner. A main switch 95, a mode selection switch 96, a vehicle speed sensor 97, a first coolant flow meter 98 and a second coolant flow meter 99 are connected to the control unit 94 to feed the unit 94 with various information signals. The main switch 95 is used for turning ON or OFF an automotive air conditioning device in which the system 10A is installed. The mode selection switch 96 is used for permitting the air conditioning device to select a heating mode or a cooling mode. The first coolant flow meter 98 meters the full flow of coolant directed to the branch point 22 (see FIG. 1) from the receiver dryer 20, while, the second coolant flow meter 99 meters the part flow of coolant directed toward the outside evaporator 28 from the branch point 22.

Figure 9:
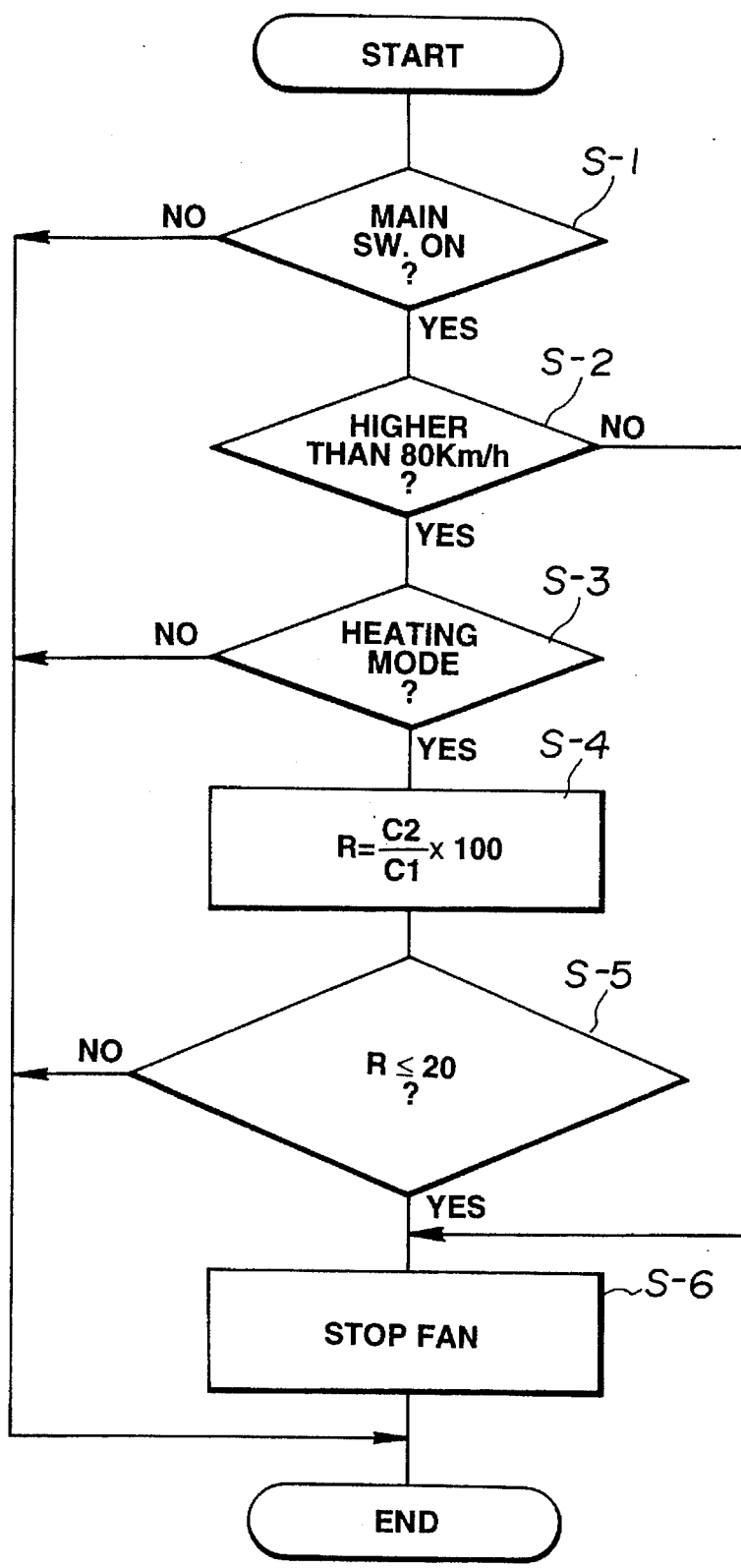
FIG. 9 is a flowchart showing programmed operation steps carried out by a control unit of the blower control circuit of FIG. 8.

FIG. 9 is a flowchart showing programmed operation steps carried out by the control unit 94 for controlling the electric fan 44.

At step S-1, a judgement is carried out as to whether the main switch 95 has been turned ON or not. If YES, the operation flow goes to step S-2. At this step, a judgement is carried out as to whether the vehicle speed is lower than 80 Km/h or not. If NO, that is, when the vehicle is running at a speed higher than 80 Km/h, the operation flow goes to step S-6 to instantly stop the electric fan 44. That is, when the vehicle is running at a higher speed, a sufficient amount of outside air can be led to the outside evaporator 28, and thus, energization of the electric fan 44 is unnecessary. If YES at step S-2, that is, when the vehicle is running at a speed lower than 80 Km/h, the operation flow goes to step S-3. At this step, treating the information signal from the mode selection switch 96, a judgement is carried out as to whether the air conditioning device has selected the heating mode or not. If NO, that is, when the air conditioning device has selected the cooling mode, the control operation is ended. While, if YES at step S-3, the operation flow goes to step S-4. At this step, treating the information signals from the first and second coolant flow meters 98 and 99, the rate (percentage) "R" of the part flow "C2" of coolant directed to the outside evaporator 28 relative to the full flow "C1" of coolant directed to the branch point 22 from the receiver dryer 20 is calculated. Then, the operation flow goes to step S-5. At this step, a judgement is carried out as to whether the rate "R" is lower than 20% or not. If NO, that is, when the rate "R" is higher than 20%, the control operation is ended without stopping the electric fan 44. If YES at step S-5, that is, when the rate "R" is lower than 20%, the operation flow goes to step S-6 and instantly stop the electric fan 44.

By controlling the electric fan 44 in the above-mentioned manner, the electric fan 44 can be operated effectively and thus power saving is achieved.

If desired, the rate "R" may be 15% or 25% depending on the performance needed by the outside evaporator 28.

Figure 10:
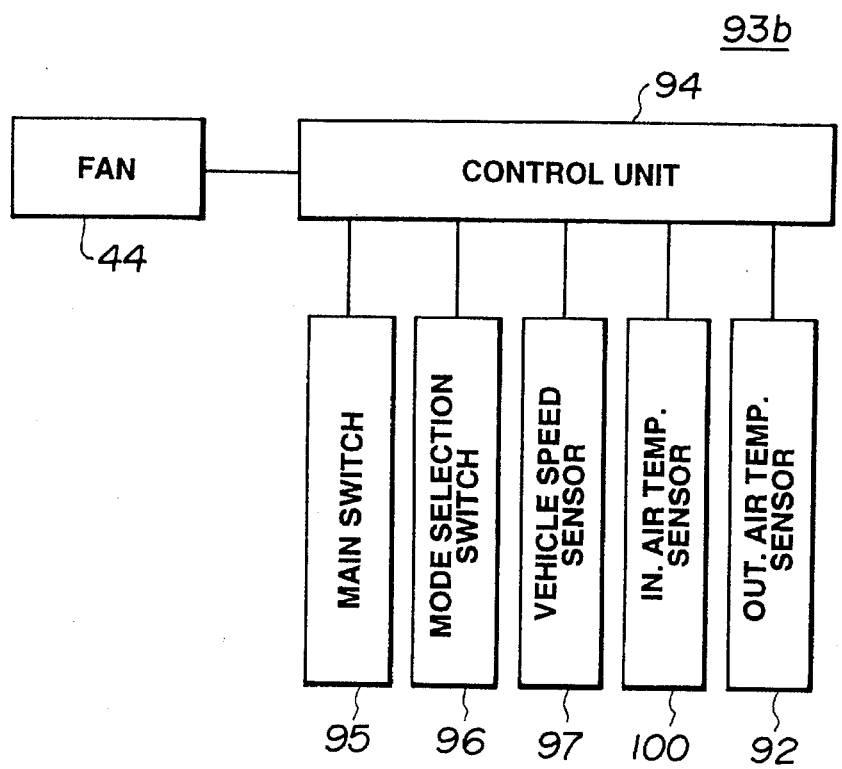
FIG. 10 is a block diagram similar to that of FIG. 8, but showing another blower control circuit for the electric blower.

FIG. 10 is a block diagram of another control circuit 93b which controls operation of the electric fan 44. The circuit 93b comprises a control unit 94 which controls the fan 44 in ON/OFF manner. A main switch 95, a mode selection switch 96, a vehicle speed sensor 97, an indoor air temperature sensor 100 and an outside air temperature sensor 92 are connected to the control unit 94 to feed the unit 94 with various information signals. The indoor air temperature sensor 100 senses the temperature in the passenger room.

Figure 11:
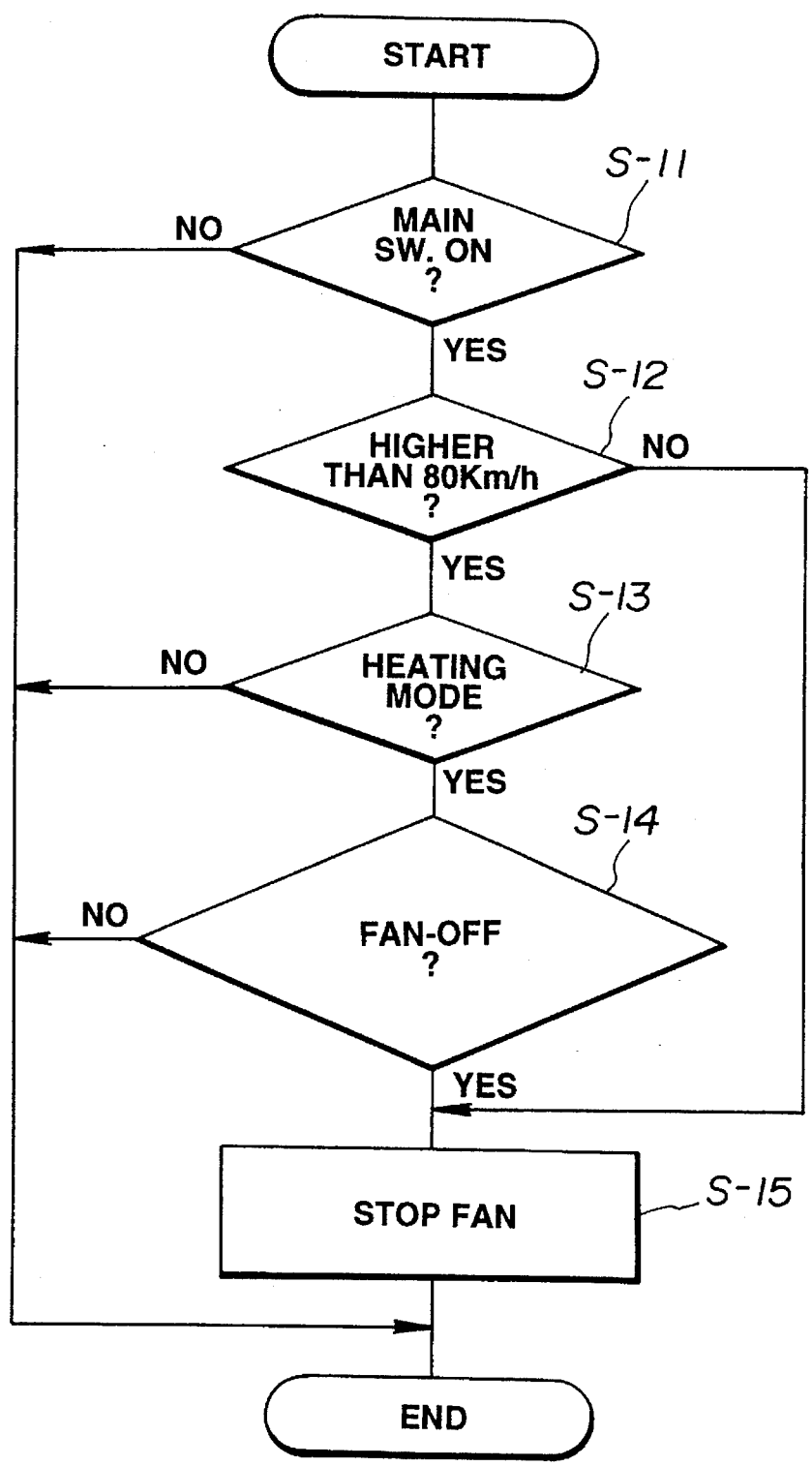
FIG. 11 is a flowchart similar to that of FIG. 9, but showing programmed operation steps carried out by a control unit of the blower control circuit of FIG. 10.

FIG. 11 is a flowchart showing programmed operation steps carried out by the control unit 94 for controlling the electric fan 44.

At step S-11, a judgement is carried out as to whether the main switch 95 has been turned ON or not. If YES, the operation flow goes to step S-12. At this step, a judgement is carried out as to whether the vehicle speed is lower than 80 Km/h or not. If NO, that is, when the vehicle speed is higher than 80 Km/h, the operation flow goes to step S-15 to instantly stop operation of the electric fan 44. If YES at step S-12, that is, when the vehicle speed is lower than 80 Km/h, the operation flow goes to step S-13. At this step, treating the information signal from the mode selection switch 96, a judgement is carried out as to whether the air conditioning device has selected the heating mode or not. If NO, that is, when the air conditioning device has selected the cooling mode, the control operation is ended. While, if YES at step S-13, the operation flow goes to step S-14. At this step, treating the information signals from the two temperature sensors 100 and 92, a judgement is carried out as to whether the fan 44 should be stopped or not. That is, for this judgement, judge-maps stored in the control unit 94 are used as will be described hereinafter. If YES at step S-14, the operation flow goes to step S-15 and instantly stops the electric fan 44. While, if NO at step S-14, the control operation is ended without stopping the fan 44.

Figure 12:
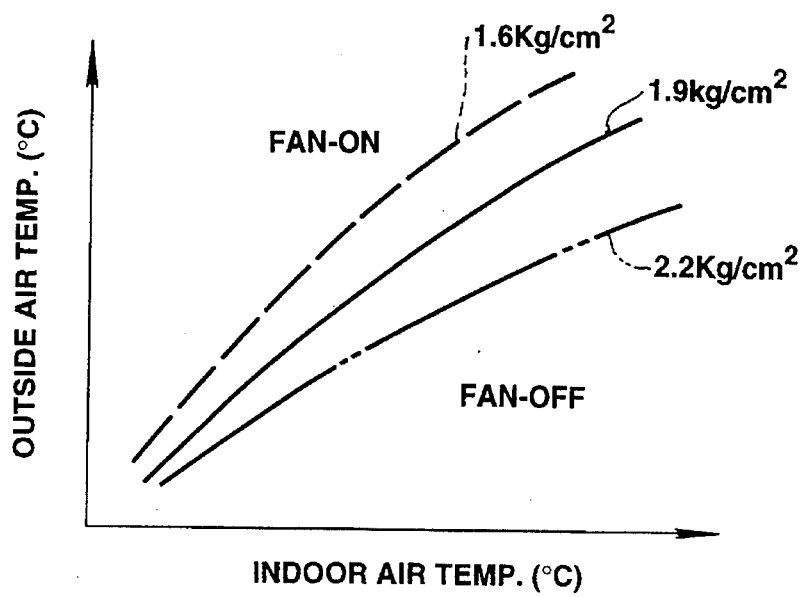
FIG. 12 is a graph showing judge-maps which are used for controlling the blower control circuit of FIG. 10.

FIG. 12 is a graph showing three judge-maps used in the step S-14 of the flowchart of FIG. 11. Each map represents one combination of the outside air temperature and the indoor air temperature with respect to a given set pressure "SP" of the pressure regulating valve 38a. The maps shown are provided for three set pressures "SP", which are 1.6, 1.9 and 2.2 Kg/cm$^2$G. If the temperatures sensed by the two temperature sensors 100 and 92 are plotted on a position below the curve of the corresponding judge-map, a "fan-off" instruction signal is applied to the control unit 94 to stop the fan 44, while, if they are plotted on a position above the curve, a "fan-on" instruction signal is applied to the control unit 94 to keep operation of the fan 44.

Figure 13:
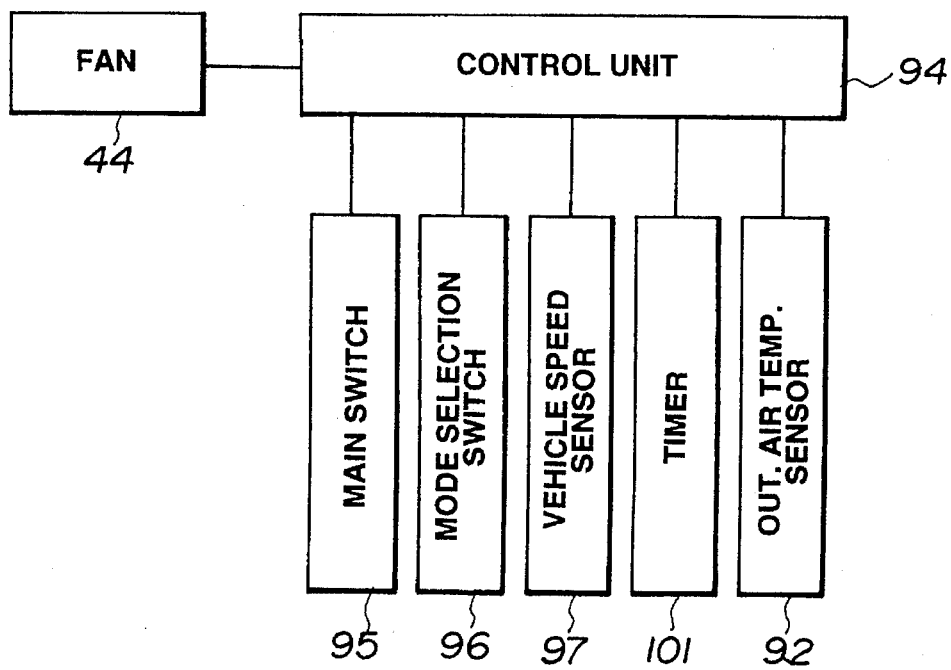
FIG. 13 is a block diagram similar to that of FIG. 8, but showing still another blower control circuit for the electric blower.

FIG. 13 is a block diagram of still another control circuit 93c which controls operation of the electric fan 44. The circuit 93c comprises a control unit 94 which controls the fan 44 in ON/OFF manner. A main switch 95, a mode selection switch 96, a vehicle speed sensor 97, a timer 101 and an outside air temperature sensor 92 are connected to the control unit 94. The timer 101 counts the time elapsed from start-up of the system 10A installed in the air conditioning device.

Figure 14:
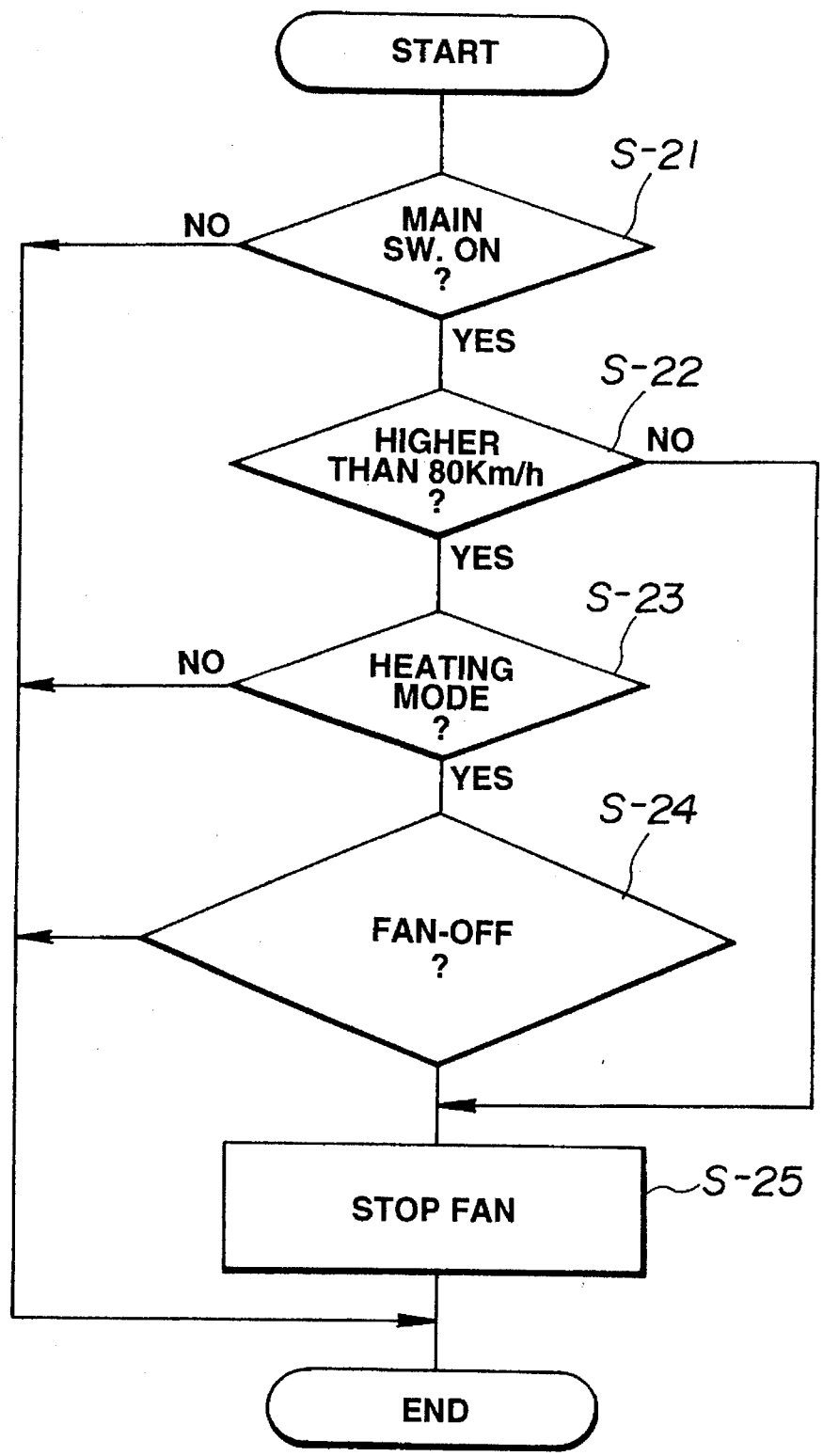
FIG. 14 is a flowchart similar to that of FIG. 9, but showing programmed operation steps carried out by a control unit of the blower control circuit of FIG. 13.

FIG. 14 is a flowchart showing programmed operation steps carried out by the control unit 94.

At step S-21, a judgement is carried out as to whether the main switch 95 has been turn ON or not. If YES, the operation flow goes to step S-22 to judge whether the vehicle speed is lower than 80 Km/h or not. If NO, the operation flow goes to step S-25 to instantly stop operation of the electric fan 44. If YES at step S-22, the operation flow goes to step S-23 to judge whether the air conditioning device has selected the heating mode or not. If YES, the operation flow goes to step S-24. At this step, treating the information signals from the timer 101 and the outside air temperature sensor 92, a judgement is carried out as to whether the fan 44 should be stopped or not. That is, for this judgement, judge-maps stored in the control unit 94 are used as will be described hereinafter. If YES at step S-24, the operation flow goes to step S-25 to instantly stop operation of the fan 44. While, if NO, at step S-24, the control operation is ended without stopping the fan 44.

Figure 15:
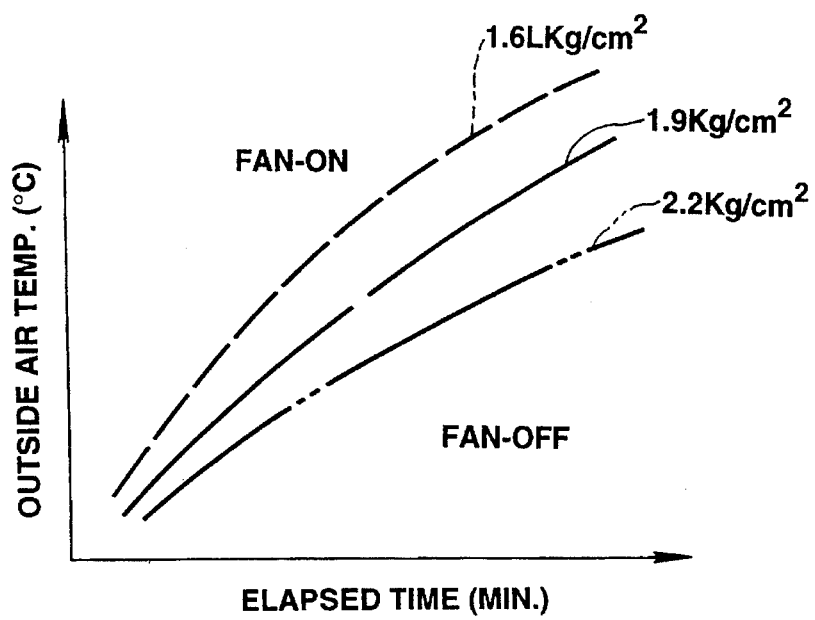
FIG. 15 is a graph similar to that of FIG. 12, but showing judge-maps which are used for controlling the blower control circuit of FIG. 13.

FIG. 15 is a graph showing three judge-maps used in the step S-24 of the flowchart of FIG. 14. Each map represents one combination of the outside air temperature and the elapsed time counted by the timer 101 with respect to a given set pressure "SP" of the pressure regulating valve 38a. The maps shown are provided for three set pressures "SP", which are 1.6, 1.9 and 2.2 Kg/cm²G. If the temperature sensed by the outside air temperature sensor 92 and the elapsed time counted by the timer 101 are plotted on a position below the curve of the corresponding judge-map, a "fan-off" instruction signal is applied to the control unit 94 to stop the fan 44, while, if they are plotted on a position above the curve, a "fan-on" instruction signal is applied to the control unit 94 to keep operation of the fan 44.

Figure 16:
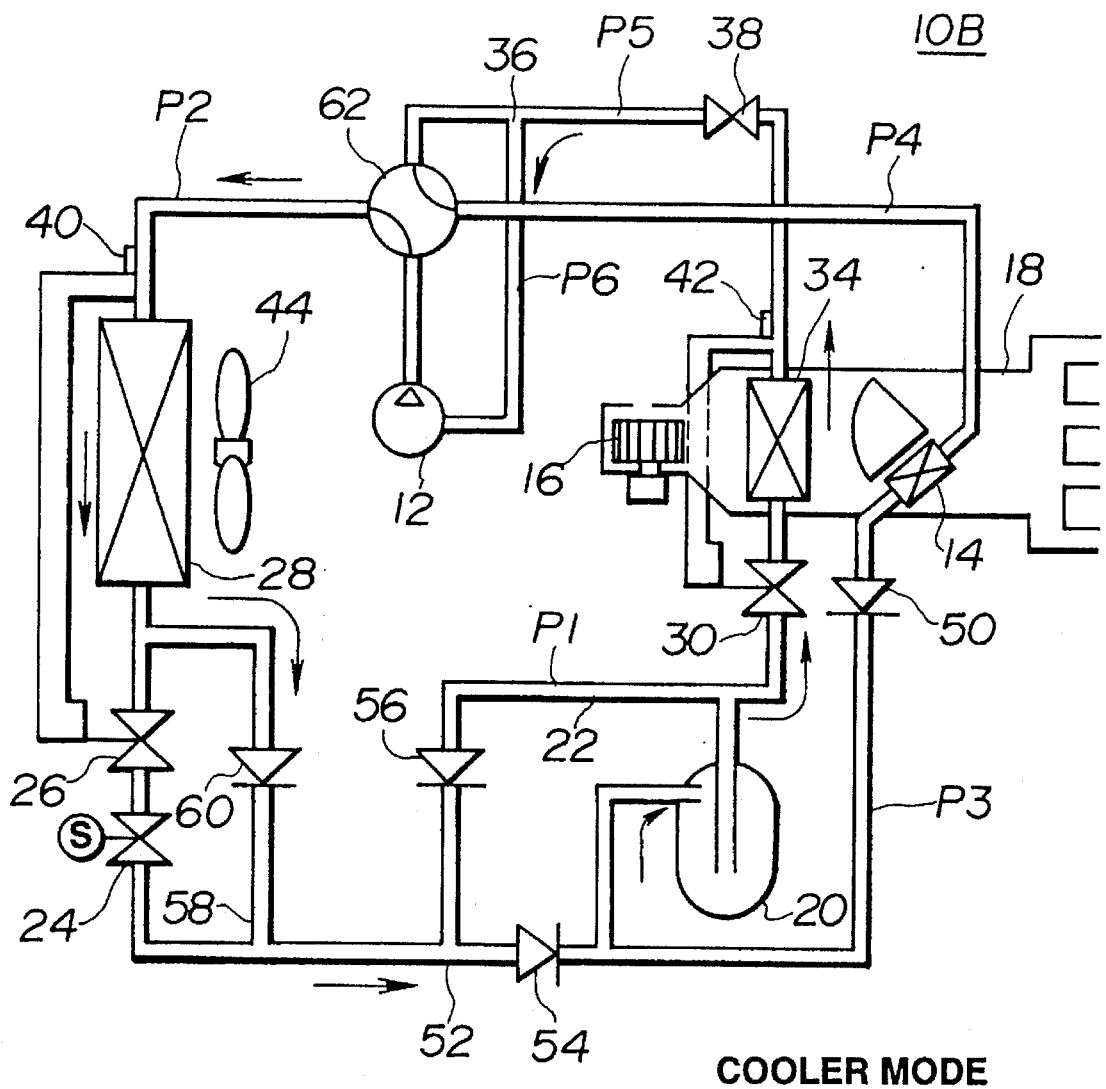
FIG. 16 is a schematically illustrated circuit of a heat pump system which is a second embodiment of the present invention, the system being designed to operate as both a heater and a cooler, the illustration showing a condition wherein the system operates as the cooler.
Figure 17:
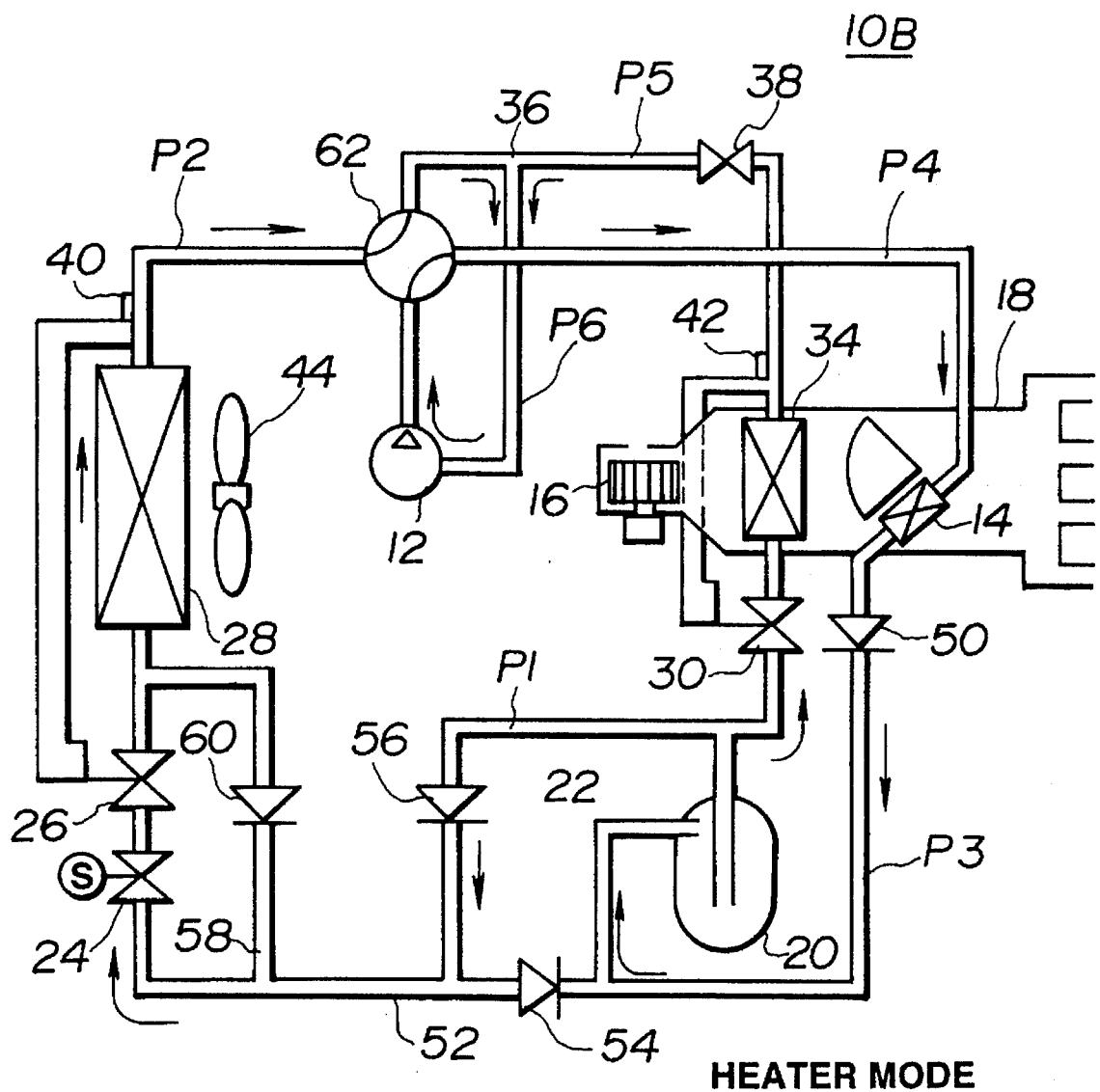
FIG. 17 is a view similar to FIG. 16, but showing a condition wherein the system operates as the heater.

Referring to FIGS. 16 and 17, there is shown a circuit of a heat pump system 10B which is a second embodiment of the present invention. As will become apparent as the description proceeds, the system 10B of this second embodiment can be used as both a heater and a cooler.

Since the base arrangement of this second embodiment 10B is similar to the above-mentioned first embodiment 10A of FIG. 1, only different portions will be described in the following.

A first check valve 50 is installed in the passage P3 which extends from the condenser 14 to the receiver dryer 20. A second check valve 54 is installed in a first bypass passage 52 which extends between the passage P3 and the passage P1. A third check valve 56 is installed in the passage P1. A second bypass passage 58 bypasses both the electromagnetic valve 24 and the outside expansion valve 26. A fourth check valve 60 is installed in the second bypass passage 58.

In addition to the above, a flow switch circuit is employed, which comprises a two-way valve 62. The two way-valve 62 can pivot between a cooler position as shown in FIG. 16 and a heater position as shown in FIG. 17. In the cooler position of FIG. 16, the two-way valve 62 connects the outlet of the compressor 12 with the passage P2 and connects the passage P4 from the condenser 14 with the passage P5 from the pressure regulating valve 38. The inlet of the compressor 12 is connected to the passage P5 through a passage P6. While, in the heater position of FIG. 17, the two-way valve 62 connects the outlet of the compressor 12 with the passage P4 and connects the passage P2 with the passage P5.

When it is needed to operate the heat pump system 10B as a cooler, the two-way valve 62 is turned to take the cooler position as shown in FIG. 16. Under this condition, the compressed coolant from the compressor 12 is forced to flow in the direction of the arrows. That is, under this cooler mode, the compressed coolant from the compressor 12 is led into the outside evaporator 28 and cooled by the outside air, and then led into the receiver dryer 20. The cooled and compressed coolant is then expanded by the inside expansion valve 30 and led into the inside evaporator 34 to cool the air which flows in the duct 18 toward the passenger room.

While, when it is needed to operate the heat pump system 10B as a heater, the two-way valve 62 is turned to take the heater position as shown in FIG. 17. Under this condition, the compressed coolant from the compressor 12 is forced to flow in the direction of the arrows, which is substantially the same as the coolant flow of the above-mentioned first embodiment 10A of FIG. 1.

What is claimed is:

1. A heat pump type air conditioning system comprising:
   an air duct in which air flows in a given direction with an aid of air blowing means; and
   a first circuit which includes:
   a condenser disposed in said air duct;
   a compressor having an outlet connected to an inlet of said condenser;
   a receiver dryer having an inlet connected to an outlet of said condenser;
   an outside expansion valve having an inlet connected to an outlet of said receiver dryer through a first passage;
   an outside evaporator having both an inlet connected to an outlet of said outside expansion valve and an outlet connected to an inlet of said compressor through a second passage;
   an inside evaporator disposed in said air duct at a position upstream of said condenser;
   an inside expansion valve having both an inlet connected to said first passage and an outlet connected to an inlet of said inside evaporator; and
   coolant distributing means which feeds said inside evaporator with at least a part of coolant discharged from said receiver dryer when the coolant pressure in an outlet of said inside evaporator exceeds a predetermined degree.

2. A heat pump type air conditioning system as claimed in claim 1, in which said coolant distributing means comprises:
   a third passage extending from said second passage to the outlet of said inside evaporator; and
   a pressure regulating valve operatively installed in said third passage, said valve being opened when the coolant pressure in its inlet exceeds said predetermined degree.

3. A heat pump type air conditioning system as claimed in claim 2, in which said coolant distributing means further comprises:
   an electromagnetic valve installed in said first passage at a position between said receiver dryer and said outside expansion valve, said electromagnetic valve closing said first passage when electrically energized.

4. A heat pump type air conditioning system as claimed in claim 1, in which NON-CFC Refrigerant is used as the coolant.

5. A heat pump type air conditioning system as claimed in claim 2, further comprising control means which controls the set pressure of said pressure regulating valve in accordance with the outside air temperature.

6. A heat pump type air conditioning system as claimed in claim 5, in which said control means comprises:
   electric biasing means which, upon receiving an electric power, produces a force for biasing said pressure regulating valve to take its closed position;
   a power supplier for feeding said electric biasing means with the electric power;
   an outside air temperature sensor which issues an instruction signal representing the temperature of the outside air; and
   a control unit which controls the electric power from the power supplier in accordance with the instruction signal from said outside air temperature sensor.

7. A heat pump type air conditioning system as claimed in claim 6, in which said pressure regulating valve comprises:
   a base body having therein a bent passage, said bent passage having one end connected to said outlet of said inside evaporator and the other end connected to said second passage;
   a valve member which closes said bent passage when assuming its close position; and
   biasing means for biasing said valve member in a direction away from said close position,
   wherein said valve member is biased to take said close position when said electric biasing means receives the electric power.

8. A heat pump type air conditioning system as claimed in claim 7, in which said electric biasing means comprises:

a solenoid coil mounted on said valve body; and a plunger axially movable in said solenoid coil, said plunger having one end put on said valve member.

9. A heat pump type air conditioning system as claimed in claim 1, further comprising:

an electric fan which, when energized, produces air flow to cool said outside evaporator; and control means for deenergizing said electric fan when cooling of said outside evaporator becomes unnecessary.

10. A heat pump type air conditioning system as claimed in claim 9, in which said control means comprises:

means for stopping said electric fan when the speed of an associated vehicle on which said air conditioning system is mounted exceeds a predetermined degree.

11. A heat pump type air conditioning system as claimed in claim 10, in which said control means further comprises:

means for stopping operation of said electric fan when the rate of the amount of coolant directed to said outside evaporator relative to the amount of coolant discharged from said receiver dryer becomes smaller than a predetermined value.

12. A heat pump type air conditioning system as claimed in claim 10, in which said control means further comprises:

means for stopping operation of said electric fan when the existing outside air temperature is lower than a given degree which has been predetermined based on both the outside air temperature and the temperature in a passenger room of the vehicle.

13. A heat pump type air conditioning system as claimed in claim 10, in which said control means further comprises:

means for stopping operation of said electric fan when the existing outside air temperature is lower than a predetermined degree which has been predetermined based on both the outside air temperature and the time elapsed from start-up of the air conditioning system.

14. A heat pump type air conditioning system as claimed in claim 1, further comprising a second circuit which is incorporated with said first circuit to permit the air conditioning system to serve as both a heater and a cooler.

15. A heat pump type air conditioning system as claimed in claim 14, in which said second circuit comprises:

a first check valve interposed between the outlet of said condenser and the inlet of the receiver dryer;

a second check valve interposed between the inlet of said receiver dryer and the inlet of said outside expansion valve;

a third check valve interposed between the outlet of said receiver dryer and the inlet of said outside expansion valve;

a bypass passage bypassing said outside expansion valve;

a fourth check valve installed in said bypass passage; and a two-way valve which can pivot between a cooler position and a heater position, said cooler position being a position wherein the outlet of said compressor is connected with the outlet of said outside evaporator and at the same time the outlet of said pressure regulating valve is connected with the inlet of said condenser, said heater position being a position wherein the outlet of said compressor is connected with the inlet of said condenser and at the same time the outlet of said outside evaporator is connected with said outlet of said pressure regulating valve.

16. A heat pump type air conditioning system as claimed in claim 1, in which the throttle operation of said outside expansion valve is controlled by a first temperature sensor which is positioned near the outlet of said outside evaporator, and in which the throttle operation of said inside expansion valve is controlled by a second temperature sensor which is positioned near the outlet of said inside evaporator.

17. A heat pump type air conditioning system as claimed in claim 1, in which said air duct comprises:

means for defining at a position upstream of said air blowing means first and second openings, said first opening being communicated with the open air and the second opening being communicated with the passenger room; and a damper door which selectively opens and closes said first and second openings.

* * * * *